(12) United States Patent
Rushing

(10) Patent No.: US 9,661,806 B2
(45) Date of Patent: May 30, 2017

(54) TREE REMOVAL DEVICE AND METHOD

(71) Applicant: James W. Rushing, Ranger, TX (US)

(72) Inventor: James W. Rushing, Ranger, TX (US)

( * ) Notice: Subject to any disclaimer, the term of this patent is extended or adjusted under 35 U.S.C. 154(b) by 1132 days.

(21) Appl. No.: 13/721,159

(22) Filed: Dec. 20, 2012

(65) Prior Publication Data

US 2014/0174604 A1  Jun. 26, 2014

(51) Int. Cl.
*A01G 23/06* (2006.01)

(52) U.S. Cl.
CPC .................... *A01G 23/067* (2013.01)

(58) Field of Classification Search
CPC ...... A01G 23/04; A01G 23/043; A01G 23/06; A01G 23/062; A01G 23/065; E21B 15/006; E21B 21/015; E21B 10/44; E21B 10/26; E21B 7/008
USPC .............. 144/24.12; 405/231, 232, 241, 249, 405/252.1, 253; 37/301, 302, 303
See application file for complete search history.

(56) References Cited

U.S. PATENT DOCUMENTS

| | | | |
|---|---|---|---|
| 911,504 A * | 2/1909 | Jay | ........................... E02D 5/80 119/780 |
| 1,012,962 A | 12/1911 | Anderson | |
| 1,114,505 A | 10/1914 | Moore | |
| 1,164,659 A | 12/1915 | Moore | |
| 3,307,643 A | 3/1967 | Ferri | |
| 3,914,883 A | 10/1975 | Bodine | |
| 4,637,442 A | 1/1987 | Mozer | |
| 6,216,803 B1 * | 4/2001 | Deken | ................... E21B 15/006 173/188 |
| 8,006,726 B2 | 8/2011 | Lawson | |
| 2012/0111453 A1 | 5/2012 | Kline | |

FOREIGN PATENT DOCUMENTS

| | | | |
|---|---|---|---|
| DE | 3441520 | 9/1985 | |
| FR | 2561062 | 9/1985 | |
| GB | 2217163 A * | 10/1989 | ........... A01G 23/065 |
| SU | 458309 | 1/1975 | |
| SU | 709034 | 1/1980 | |
| SU | 1641228 | 4/1991 | |

* cited by examiner

*Primary Examiner* — Matthew G Katcoff
(74) *Attorney, Agent, or Firm* — Decker Jones P. C.; Brian K. Yost; Geoffrey Mantooth

(57) ABSTRACT

The device may be coupled to a tractor and comprises a housing comprising vertical walls and a sliding arrangement, and a shaft, base plate, stabilizing portion, motor, and bit assembly. A coupling plate may be coupled to a cooperative coupling plate of the tractor. The shaft extends vertically from the motor to the base plate. The bit assembly is coupled to the lower end of the shaft. The stabilizing portion comprises a tubular member extending from the baseplate. The method of removing a tree comprising a trunk and roots, the roots being below ground, comprises the steps of engaging the trunk with a stabilizer; bending said trunk with the stabilizer; securing the trunk with said stabilizer; inserting a rotating bit into the ground; driving the rotating bit into an area occupied by said roots; and engaging said roots with the rotating bit assembly.

6 Claims, 8 Drawing Sheets

TREE REMOVAL DEVICE AND METHOD

BACKGROUND OF THE INVENTION

1. Field of the Invention

The present invention generally relates to a device and method for removing a tree, and specifically to a hydraulic device that may be coupled to a tractor and used to eradicate a mesquite tree.

2. Background of the Invention

In the Southwest, farmers and ranchers fight a constant battle against mesquite trees (genus *Prosopis*) "mesquites". Mesquites propagate in pastures and fields very prolifically. Many farmers and ranchers consider mesquite trees a nuisance because they have very sharp thorns, sometimes as long as two inches. These needle-like thorns can injure cattle, horses, and livestock. Additionally, mesquites compete with native pasture for water and nutrients. A mesquite can thrive in very dry climates because of an extremely long tap root which can reach the water table, sixty or more feet below the surface.

Because of their particular biological makeup, mesquites are difficult to eradicate. Conventional methods for removing or reducing mesquite populations include mechanical treatment such as grubbing, chaining, shredding, or roller chopping. However, such methods are often unsuccessful because a mesquite has root buds below the surface. Unless these root buds are eliminated, the tree will regrow and send up multiple shoots upon injury or damage to the main trunk. Therefore, a mesquite cannot be permanently removed simply by cutting off the tree at its trunk as may be done with most other trees. Other efforts to remove mesquites include chemical treatment. However, such methods are expensive, potentially damaging to the environment, and often ineffective.

The present disclosure provides a device and method which may be used to sever a mesquite tree trunk while also disrupting the roots and root buds such that the mesquite will not re-grow. The device can be coupled to a tractor or loader having hydraulic lifting arms such as those commonly found on utility tractors or other machinery known as "skid steer loaders", or, alternatively may be coupled to an excavator or other device adapted to be coupled to "skid steer" type attachments. The device, in some embodiments, may be adapted to be attached to a "3 point" hitch such as are found on conventional tractors and equipment.

The device comprises a housing comprising vertical walls, shaft, base plate, stabilizing portion, motor, and bit assembly. The housing comprises a coupling plate which may be coupled to a cooperative attachment plate of a tractor. The shaft extends vertically from the motor to the base plate at a lower end of the housing. The bit assembly is coupled to the lower end of the shaft. The stabilizing portion comprises a tubular member extending from the baseplate. At the lower end of stabilizing portion is a plurality of notches defining teeth.

In operation, the device may be positioned over a tree such that the tree is bent from a vertical position to a horizontal position and such that the stabilizing portion substantially surrounds the base of the tree. The tree trunk remains secured under the stabilizing portion as the shaft, together with the bit assembly, are caused to rotate in a clockwise direction and move downward, such that a hole is formed in the area below the base of the tree and the root ball and roots are destroyed by the turning bit assembly. The bit assembly comprising cutting and lopping portions, rotates within stationary stabilizing portion, and lops off any material, including the tree trunk, extending between the teeth as the lopping portions are moved to a position adjacent to the teeth. Dirt, roots, and other debris disturbed by the rotating bit assembly generally remain in the hole defined by the device or become confined within the stabilizing portion cavity. Upon sufficient agitation of the roots and root ball, the rotating bit assembly is caused to rotate in a counter-clockwise direction. This counter-clockwise movement along with upward movement of the shaft and bit assembly dislodges dirt, roots, and debris from the cavity such that the hole becomes filled and only a small mound remains following completion of the operation.

3. Description of the Prior Art

A number of patents and patent publications teach tree removal or grinding devices. For example, Anderson U.S. Pat. No. 1,012,962 teaches a device for "exterminating" stumps whereby the inside and the outside of the stump is acted on at the same time in order to cut away and destroy the stump. Moore U.S. Pat. No. 1,114,505 teaches a device for removing tree stumps whereby a cutter-head severs the roots of the stump so that the stump may then be extracted with a lift. Moore U.S. Pat. No. 1,164,659 teaches a stump removal device characterized by a centering cutter to enter the stump to center and steady the cutter head as it advances into the stump. Ferri U.S. Pat. No. 3,307,643 teaches an apparatus for the removal of tree stumps which cuts off the roots of a felled tree and then removes the stumps from the ground. Bodine U.S. Pat. No. 3,914,883 teaches a cutter blade structure which may be placed around the trunk of a tree to be harvested, and the blades thereof are driven vertically downwardly into the earth to sever the roots of the tree. Mozer U.S. Pat. No. 4,637,442 teaches a machine for coring stumps which includes an area for receiving a tree stump that has been removed from the ground. Lawson U.S. Pat. No. 8,006,726 teaches a tree stump coring apparatus comprising an elongated cylindrical cutting blade of a hollow rotatable tubular body. Kline, U.S. Patent Publication 2012/0111453 teaches a tree stump removal device comprising an annular housing having cutters to sever some or all of the horizontal roots extending from the tree stump. German patent Gerloff, DE 3441520 and French patent FR 2561062 teach a root grubbing device comprising a rotating circular cutting member that severs the roots so that the stump may be removed from the ground. Soviet Union patent Mojseenko, SU 1641228 teaches a stump removal device that cuts the lateral roots so that a lifter can raise the stump from the ground. Soviet Union patent Berzinsh, SU 458309 teaches a tree stump extractor, consisting of a rotary cylindrical cylinder. Soviet Union patent Novoselov, SU 709034 teaches a tree grubber mounted to a tractor and a cylinder which may be driven downward so that the stump may be extracted.

However all of the aforementioned devices are relatively complicated and unsuitable for removing trees with root balls, such as mesquites. What is needed is a device and method which may be used to easily sever a mesquite tree trunk and sufficiently disrupt the root and root ball systems such that the tree will not re-grow, and which will leave the soil in a relatively undisturbed condition following use.

SUMMARY OF THE INVENTION

A device which may be used to sever a mesquite tree trunk and sufficiently disrupt the root and root ball systems such that the tree will not re-grow, and which will leave the soil in a relatively undisturbed condition following use. The device comprises a housing, a shaft, a base plate, a motor unit, a stabilizing portion, and a bit assembly. The shaft extends vertically from the motor unit through the base plate which is at a lower end of the housing. The bit assembly is attached to the lower end of the shaft. The stabilizing portion comprises a tubular member and extends from the baseplate. At the lower end of stabilizing portion is a plurality of teeth.

In a preferred embodiment, the tree removal device may be mounted on a tractor. The housing comprises a coupling plate which may be coupled to a cooperative attachment plate of a tractor.

The present invention provides a method of removing a tree, the method comprises the steps of providing a tree removal device comprising a housing, shaft, bit assembly, stabilizing portion, and bit assembly; positioning the device over a tree comprising a base and a tree trunk, such that the tree trunk is bent from a generally vertical position to a generally horizontal position such that the stabilizing portion substantially surrounds the base of the tree; securing the tree trunk with said stabilizing portion; causing the shaft, together with the bit assembly, to rotate and move downward, such that a hole is formed in the area below the base of the tree; and with the rotating bit assembly, disrupting the root ball and roots.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention.

DESCRIPTION OF THE PREFERRED EMBODIMENT

Figure 1:
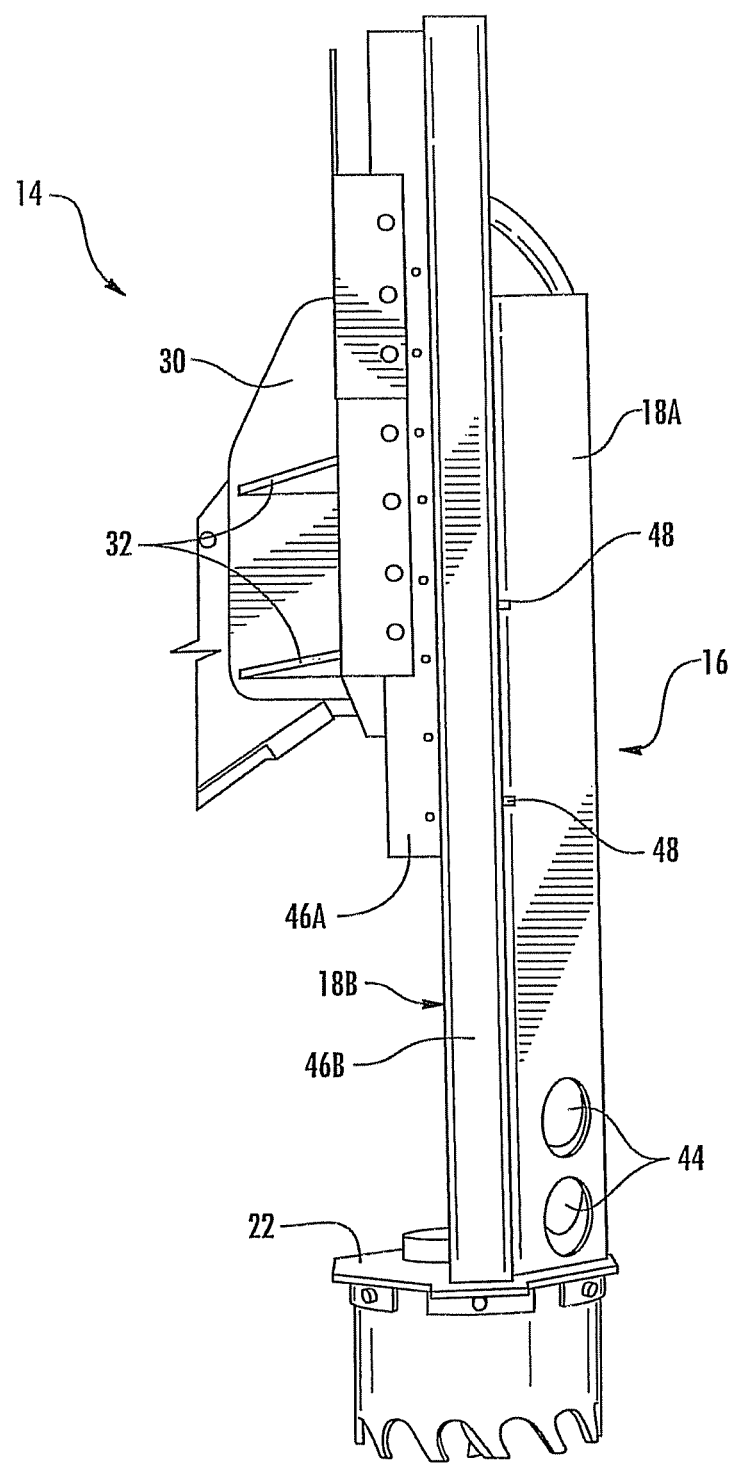
FIG. 1 is an isometric front and right side view of the tree removal device, in accordance with a preferred embodiment.

Referring to FIGS. 1-5, a tree removal device 14 is shown. In describing the embodiments of the invention, specific terminology will be used for the sake of clarity. However, the invention is not intended to be limited to the specific terms so selected, it being understood that each specific term includes all technical equivalents operating in a similar manner to accomplish a similar purpose. It is understood that the drawings are not drawn exactly to scale. In the drawings, similar reference numbers are used for designating similar elements throughout the several drawings.

The following describes particular embodiments of the invention. However, it should be understood, based on this disclosure, that the invention is not limited to the embodiments detailed herein. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, aspects, adaptations, variations, alternatives, and uses of the invention, including what is presently believed to be the best mode of carrying out the invention.

The examples and illustrations of a device and method for removing a tree are described herein with respect to removing a mesquite tree. However, the inventive system is equally applicable for use with other trees and other plant life. Moreover, while certain materials are discussed herein with respect to various components of the various embodiments, the embodiments are not limited to such materials. For example, in a preferred embodiment, certain components are formed from steel. However, the components of the device may comprise any suitable materials without departing from the scope and spirit of this disclosure. In this disclosure, the term "tractor" shall refer to those tractors and other vehicles that have lifting arms. The word "tractor" when used in this disclosure, specification, and claims, shall include, but is not limited to, utility tractors, skid steer loaders, excavators, and other machines that have one or more lifting arms to which various attachments may be coupled.

Referring to FIGS. 1-3, 4A, & 5, the device 14 comprises a housing 16 comprising vertical walls 18A, 18B, 18C, sliding arrangement 46 A, 46 B, vertical lateral supports 30, and horizontal lateral supports 32. The device 14 further comprises a shaft 20, a baseplate 22, a stabilizing portion 24, a motor unit 36 and a bit assembly 26. The shaft 20 extends vertically from an uppermost portion 28 of the housing 16 through the base plate 22 at a lower end of the housing 16. In the preferred embodiment, the shaft 20 is formed from three inch O.D. heavy wall steel tubing. However, the shaft 20 may be formed from any suitable material, such as a solid piece, without departing from the scope and spirit of this disclosure. Housing 16 further comprises a pivoting arrangement (not shown) which permits the device 14 to remain in a generally vertical position as the arms of the tractor 40 are raised and lowered and as the shaft 20 and bit assembly 26 are caused to be raised and lowered.

The vertical walls 18A, 18B, 18C of the preferred embodiment comprise, a center wall 18 C positioned at a front portion of the device 14 such that when a user is seated on a tractor 40 to which the device 14 is coupled, this wall 18 C is furthest away from the user. Throughout this disclosure, the terms "front", "rear", "rearward", "left", "right", "vertical" and "horizontal" shall refer to this perspective, that is, from the point of view of a user seated on the tractor 40 to which the device 14 is coupled. Along the vertical length of center wall 18 C, and further from a central longitudinal axis of the device 14, angled walls 18 A are coupled. These angled walls 18 A extend angularly from the center wall 18 C such that each angled wall 18 A extends rearward and outward from the center wall 18 C. Extending rearward from each angled wall 18 A are side walls 18 B. In the preferred embodiment, the center wall 18 C and angled walls 18 A, are formed from ⅜ inch steel plate and each measure approximately sixty inches in length and six inches in width (60"×6"×⅜"). The side walls 18 B, are formed from ⅜ inch steel plate and each measure approximately sixty inches in length and four inches in width (60"×4"×⅜"). In the preferred embodiment, the center 18 C and angled walls 18 A comprise through openings 44. These openings 44 permit the user to visualize the tree 12 (FIG. 4A-4D) on which the device 14 is intended to be used.

In the preferred embodiment, the angled walls 18 A are welded to the center wall 18 C and to the respective side walls 18 B. However, the center 18 C, angled 18 A, and side 18 B wall arrangement can be formed from a single piece 18 rather than the five pieces of the preferred embodiment. Further, the angled wall 18 A need not be angled. Rather, the wall 18 A can be rounded, rectangular or of other configurations without departing from the scope and spirit of the invention.

Figure 2A:
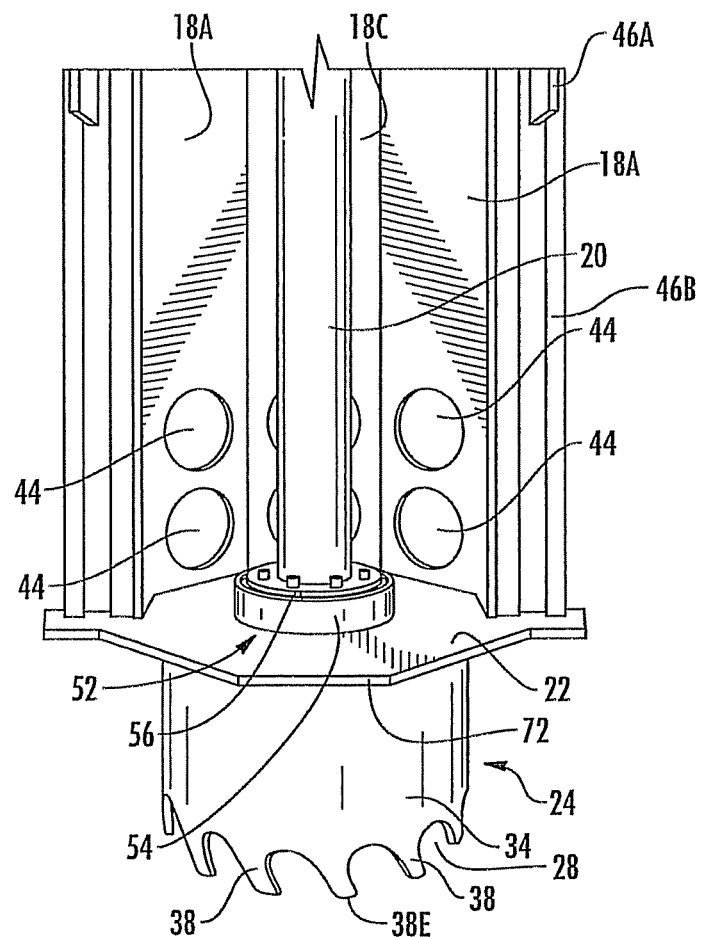
FIG. 2A is a rear elevation view of a lower portion of the tree removal device, in accordance with a preferred embodiment.
Figure 2B:
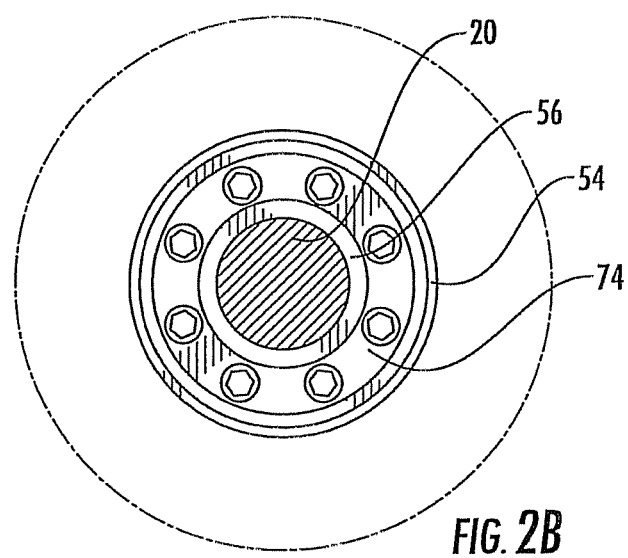
FIG. 2B is a top elevation view of the bearing ring assembly of FIG. 2A.

Referring to FIGS. 1 and 2A, coupled to each side wall 18 B is a sliding arrangement 46 A, 46 B, which permits the shaft 20 and bit assembly 26 (FIG. 3) to move upward and downward with respect to the housing 16. The sliding arrangement 46 A, 46 B comprises inner portion 46 A and outer portion 46 B. Outer portion 46 B is generally rectangular in shape and has an inside diameter slightly larger than an outside diameter of inner portion 46 A such that inner portion 46 A can slide vertically within outer portion 46 B. In the preferred embodiment, outer portion 46 B is formed from three inch by three inch by 3/16 inch square tubing (3"×3"×3/16") and inner portion 46 A is formed from two and ½ inch by two and ½ inch by 3/16 inch square tubing (2½"×2½"×3/16"). Each sliding arrangement 46 A, 46 B extends upward and above vertical walls 18A, 18B, 18C. On a forward outer surface of sliding arrangement 46 A, 46 B outer portion 46 B, there is a plurality of lubrication nipples 48 which permit lubrication of sliding arrangement 46 A, 46 B. In the preferred embodiment, the sliding arrangement permits approximately 21 inches of travel such that the blades 80 may be extended approximately 16 inches below the lower rim of the stationary stabilizer portion 24.

Referring to FIGS. 1, 2A, 2B, 3, and 5, the baseplate 22 is coupled perpendicular to the vertical walls 18A, 18B, 18C and outer portion 46 B at a lower end of the walls 18A, 18B, 18C and outer portion 46 B. Baseplate 22 is a generally flat plate formed from ½ inch steel. Baseplate 22 has a perimeter that, at the front, generally conforms to a perimeter formed by the walls 18A, 18B, 18C and sliding arrangement 46 A, 46 B. The baseplate 22 angles rearward toward a rearward edge 72 that is generally parallel to a lower edge of center wall 18 C. Baseplate 22 comprises a generally centered baseplate opening 50 (FIG. 3) and bearing ring assembly 52 through which shaft 20 extends. The bearing ring assembly 52 is coupled to baseplate 22 around the perimeter of baseplate opening 50 and comprises an outer retaining portion 54, an upper retaining portion 74, and an inner bearing 56. In the preferred embodiment, outer retaining portion 54 comprises a steel ring 54 welded to baseplate 22. However, other coupling arrangements known to those skilled in the art may also be uses to secure the steel ring 54 to the baseplate 22. For example, the steel ring 54 may be bolted to the baseplate 22. Upper retaining portion 74 comprises two pieces of steel plate, which when arranged together, form a circular flat steel plate 74 positioned above inner bearing 56 and coupled to the baseplate 22 such that, along with outer retaining portion 54, and baseplate 22, upper retaining portion 74 retains the inner bearing. Inner bearing 56 comprises, in the preferred embodiment, a pair of Teflon® bearings which, when assembled, comprise a ringed Teflon® bearing 56. Although in the preferred embodiment the shaft 20 is maintained in position by the bearing ring assembly 52 comprising an outer retaining portion 54, an upper retaining portion 74, and an inner bearing 56 the shaft 20 and bearing 56 need not be maintained in position by such an arrangement 52. Rather, the shaft 20 and bearing 56 can be maintained in position by an appropriately positioned upper retaining portion 74 alone, or in combination with other retaining arrangements.

The shaft 20 extends vertically from the motor unit 36 (see FIG. 5) through the base plate 22 at a lower end of the housing 16 (see FIG. 1). The motor unit 36 is a conventional and commercially available motor unit 36. In the preferred embodiment, the motor unit and attachment portion were obtained from a Bobcat® 30-C direct drive hydraulic unit adapted to be supported by the housing 16. In the preferred embodiment, shaft 20 is formed from three inch O.D. heavy wall steel tubing.

Figure 3A:
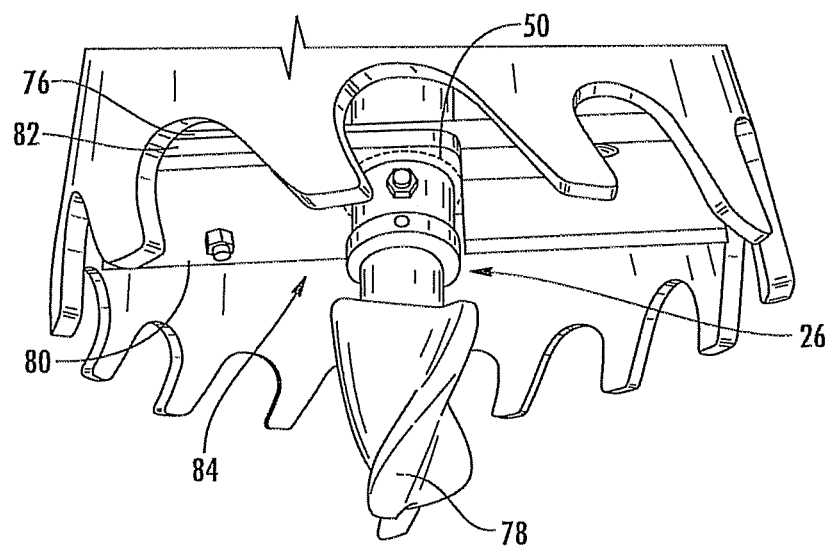
FIG. 3A is a front elevation view of a lower portion of the tree removal device, in accordance with a preferred embodiment.
Figure 3B:
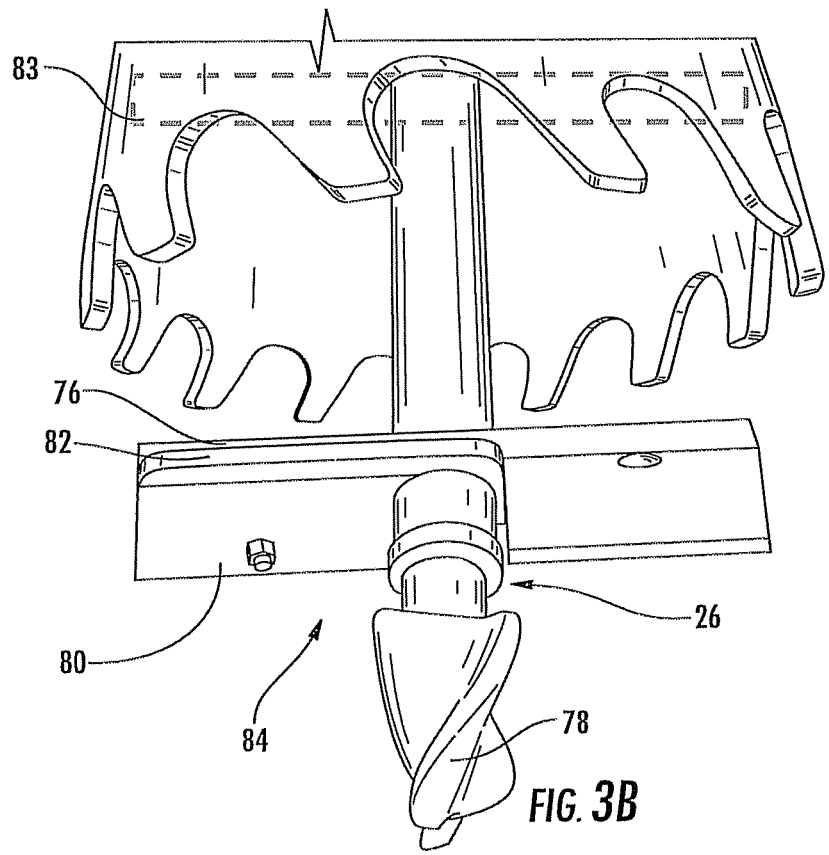
FIG. 3B is a front elevation view of a lower portion of the tree removal device of FIG. 3 with the bit assembly further extended from the stabilizing portion.

Referring to FIGS. 2A and 3, the bit assembly 26 is coupled to a lower end of the shaft 20 (see FIG. 2A) and comprises bit assembly support 76, pilot bit 78, and cutting portion 80, and shearing portion 82. The bit assembly support 76 is coupled perpendicularly to the lower end of shaft 20. Pilot bit 78 is coupled to the bit assembly support 76 such that a pilot bit longitudinal axis aligns with a shaft longitudinal axis. The pilot bit 78 comprises a conventional and commercially available conical auger shaped configuration. Cutting portions 80 comprise one or more blades 80 coupled to the bit assembly support 76 and extending radially from the shaft 22 longitudinal axis. In the preferred embodiment, the blades 80 are each one piece on either side of the shaft 22 and are removably coupled to the bit assembly support 76. However, conventional and commercially available blades 80 may be coupled to the bit assembly support 76. The bit assembly support 76 and cutting portions 80 have lengths approximately equal to one another such that a bit assembly 26 diameter is defined by such lengths. This bit assembly 26 diameter is slightly smaller than an inside diameter of stationary stabilizing portion 24 such that the bit assembly 26 may travel vertically or telescope within the stationary stabilizing portion 24.

Referring to FIGS. 1, 2A, 3, 4A, and 5, the stationary stabilizing portion 24 comprises a tubular member 34 extending downward from the baseplate 22. At a lower end of stabilizing portion 24 are notches 28 or cavities 28 defining a plurality of teeth 38 or scalloped portions 38. In the preferred embodiment, tubular member 34 is formed from twelve and ⅝ inch inside diameter ½ inch wall steel tubing or thicker. In the preferred embodiment, teeth 38 are generally blunt or squared at teeth ends 38 E. The teeth 38 have an arcuate configuration, are approximately four inches in length, and are spaced approximately three inches from one another. The bit assembly 26 (FIG. 3) and stationary stabilizing portion 24, are arranged and positioned such that when the bit assembly is rotated within stationary stabilizing portion 24, any material extending between the teeth 38 will be lopped off by blades 82 when the edge of the rotating blades 80 are moved to a position adjacent to the teeth 38.

Figure 4A:
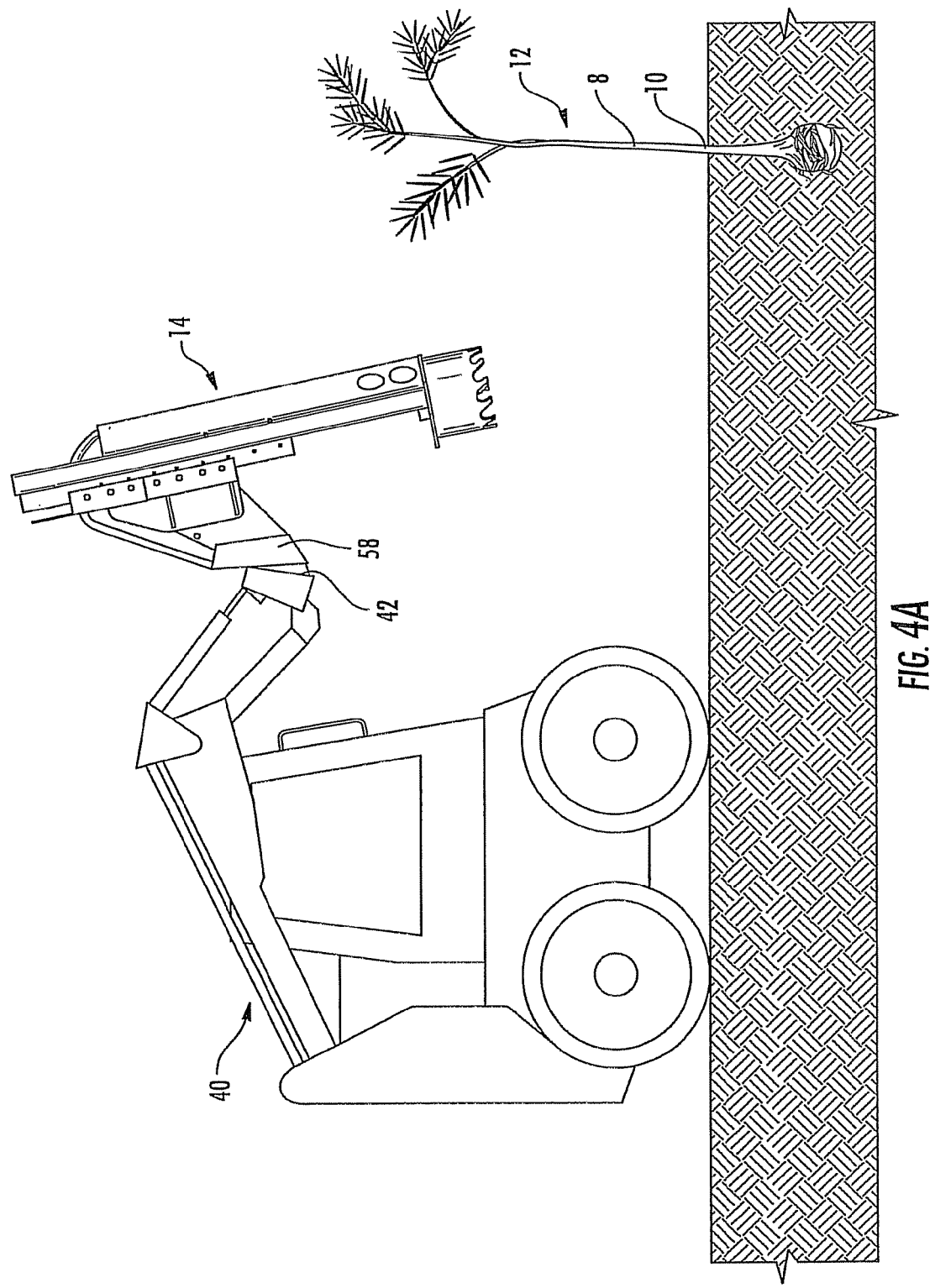
FIG. 4A is a right view of the tree removal device attached to a skid steer type tractor, in accordance with a preferred embodiment.
Figure 4B:
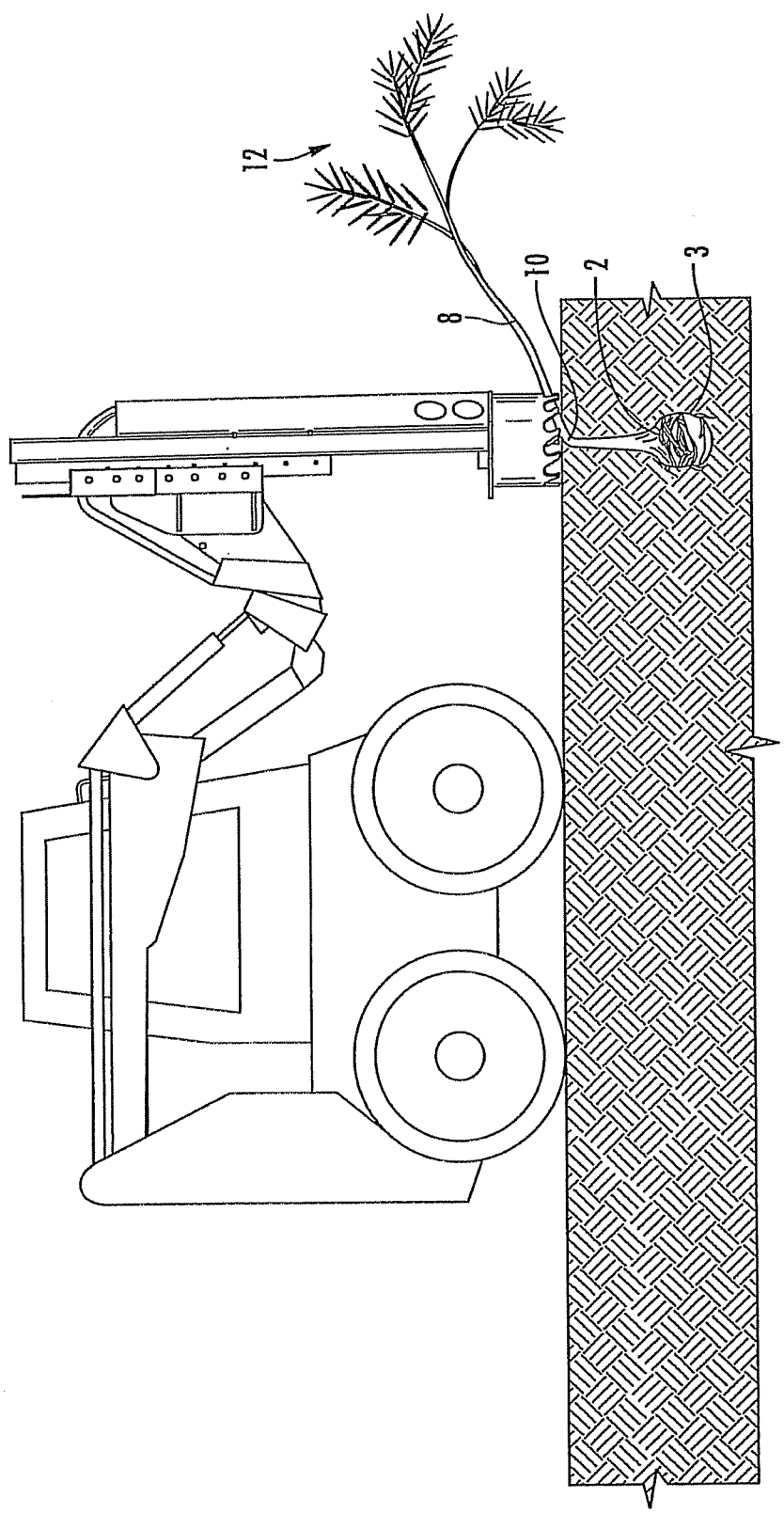
FIG. 4B is a right view of the tree removal device of FIG. 4A, wherein the device is placed over a tree to be eradicated.
Figure 4C:
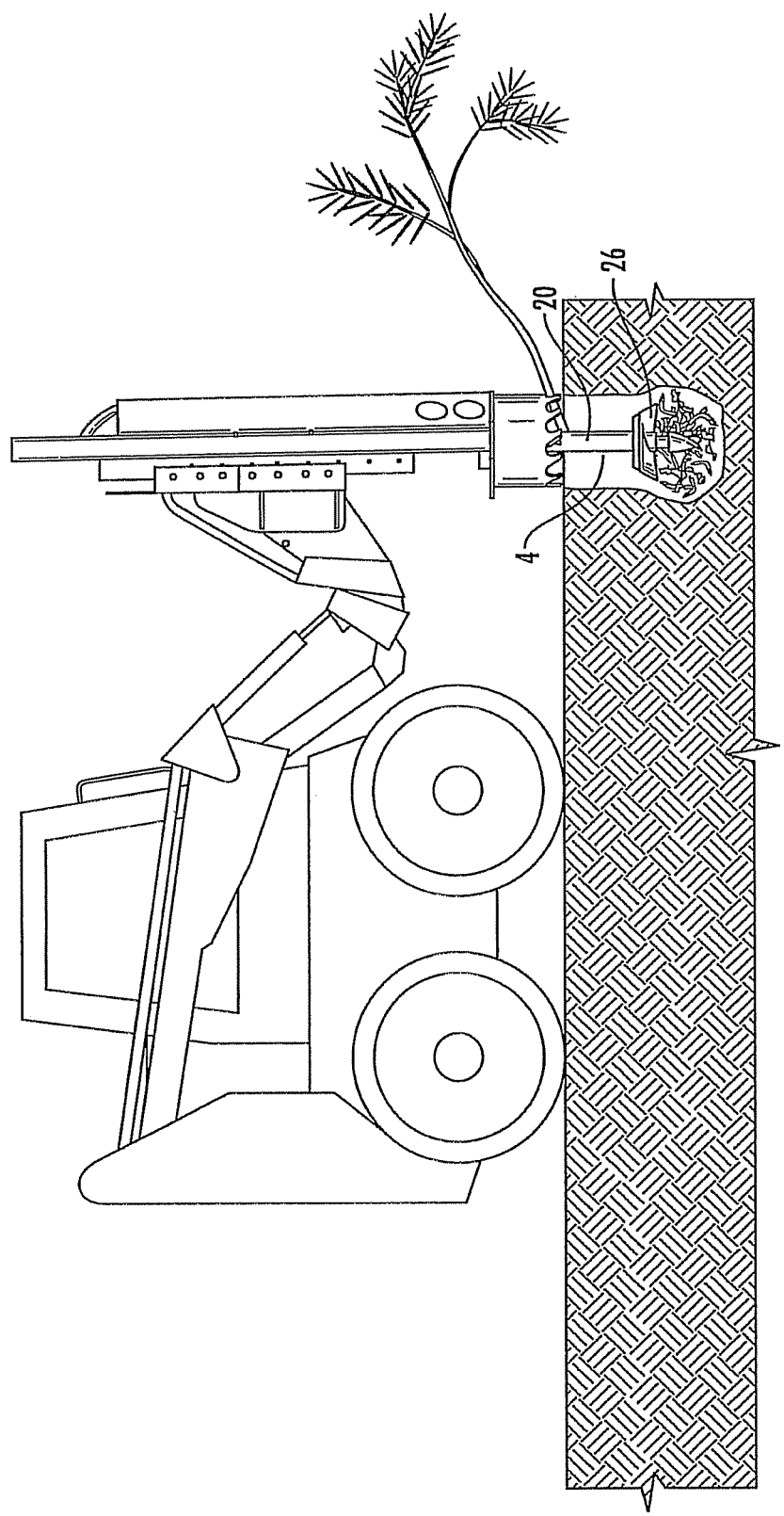
FIG. 4D is a right view of the tree removal device of FIG. 4C, wherein the bit assembly has been removed from the hole, the hole has been filled, and the tree trunk has been severed.
Figure 4D:
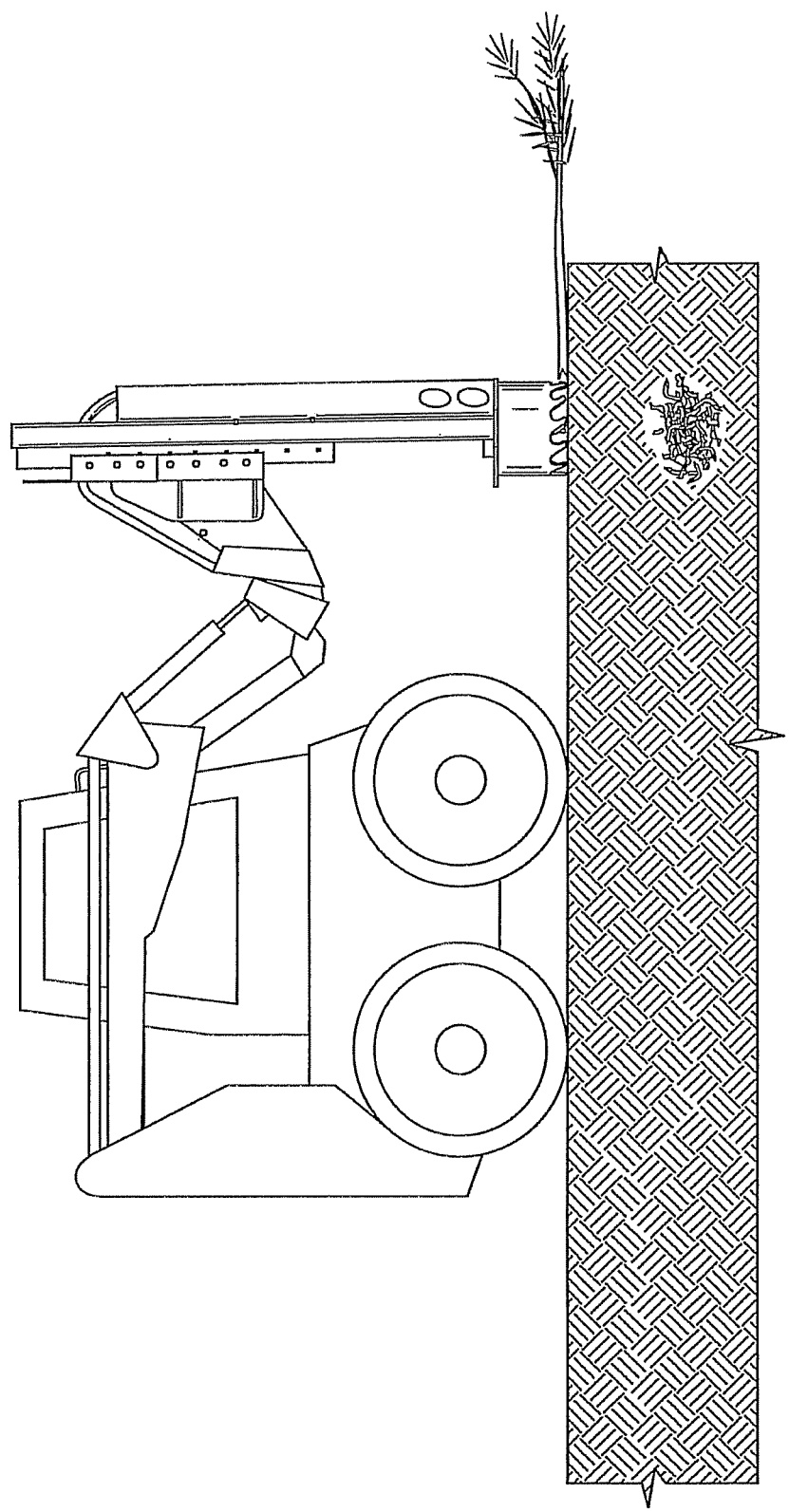

Referring to FIG. 4A, in a preferred embodiment, the tree removal device 14 may be mounted on a tractor 40. The housing 16 (FIG. 1) comprises a coupling plate 58 (FIGS. 4A, 5) which may be coupled to a coupling portion 42 of the tractor 40. In the preferred embodiment, the tractor 40 is a skid steer tractor 40 and this coupling portion 42 is a cooperative skid steer attachment plate 42.

Figure 5:
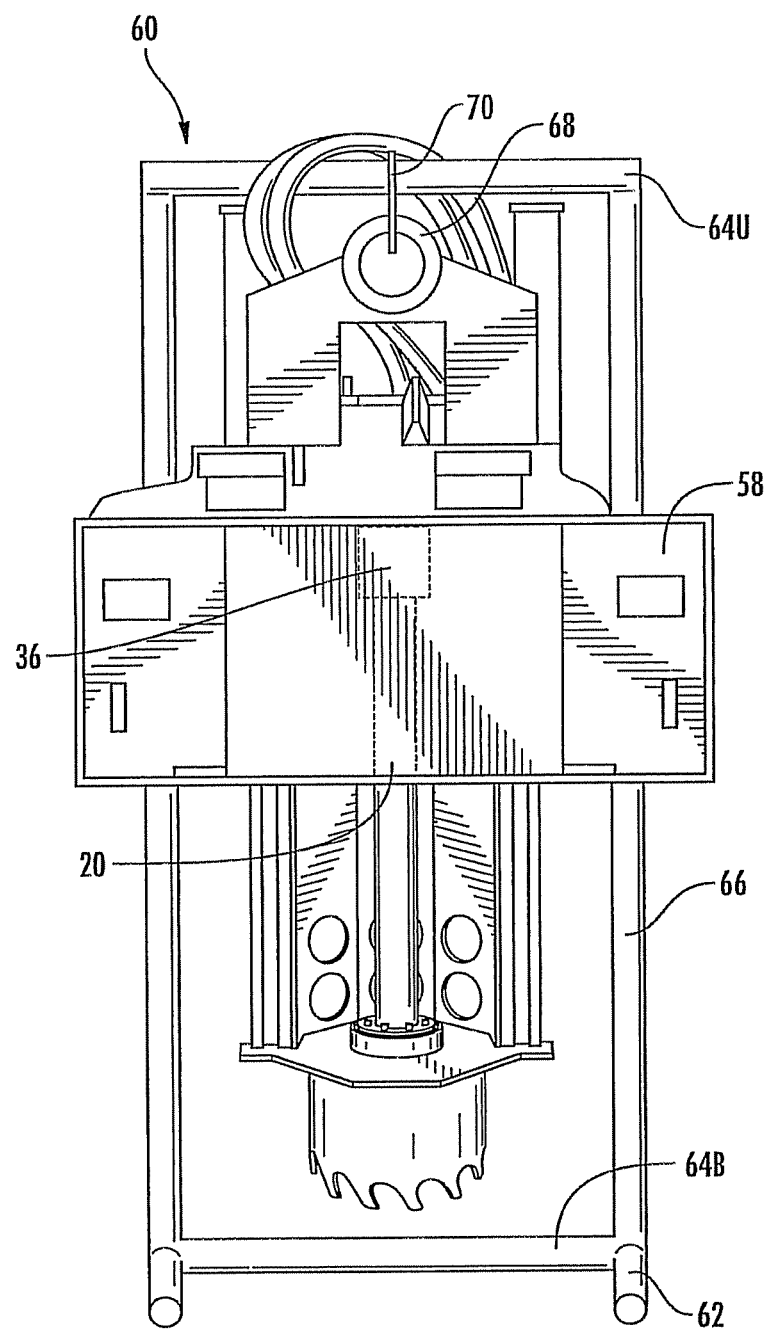
FIG. 5 is a rear elevation view of the tree removal device removed from the tractor and suspended from a storage rack.

Referring to FIG. 5, the device 14 may be easily removed from the tractor 40 coupling portion 42 and stored on a storage rack 60. In the preferred embodiment, the storage rack 60 comprises vertical portions 66, horizontal frame portions 64U, 64B, comprising upper horizontal portion 64U and horizontal base portion 64B. Horizontal base portion 64B comprises perpendicularly extending leg members 62 extending outward from the rack 60 at a junction between the vertical portions 66 and the horizontal base portion 64B. An upper horizontal portion 64 U comprises a centrally positioned hook 70. As the device 14 comprises an upper ring 68 which may be engaged with the hook 70, the device 14 may easily be suspended from the storage rack 60. The base portions 62 are generally arranged perpendicular to the lower horizontal frame portion 64 such that the rack 60 is maintained in a vertical position, as shown in FIG. 5.

Referring to FIGS. 2, 3 and 4A-4D, in operation, the device 14 may be positioned over a tree 12 such that the tree 12 is bent from a vertical position to a horizontal position and such that the stabilizing portion 24 (FIG. 2A) substantially surrounds the base 10 of the tree 12. The tree trunk 8 remains secured under the stabilizing portion 24 as the shaft 20 (FIG. 2A), together with the bit assembly 26 (FIG. 3), are caused to rotate in a clockwise direction and move downward, such that a hole 4 is formed in the area below the base 10 of the tree 12 and the root ball 3 and roots 2 are destroyed by the turning bit assembly 26. The bit assembly 26 comprising cutting 80 and shearing portions 82, rotates within stationary stabilizing portion 24, and lops off any material, including the tree trunk 8, extending between the teeth 38 as the blades 80 are moved to a position adjacent to the teeth 38. As may be seen in FIG. 3B, on the underside of the baseplate 22 is a scraper 83 which comprises a horizontal piece of material 83 extending downward from the baseplate 22. The shearing portion 82, when rotated as the shaft 20 is moved upward, comes in proximity to the scraper 83 and shears any roots, debris, or other material that may otherwise become entangled with the shaft 20 and bit assembly 26. In the preferred embodiment, scraper 83 comprises a length of angle iron 83. Dirt, roots 2, and other debris disturbed by the rotating bit assembly 26 generally remain in the hole 4 defined by the device 14 or become confined within the stabilizing portion 24 cavity 84. Upon sufficient agitation of the roots 2 and root ball 3, the rotating bit assembly 26 is caused to rotate in a counter-clockwise direction. This counter-clockwise movement along with upward movement of the shaft 20 and bit assembly 26 comprising the shearing portion 82, dislodges dirt, roots, and debris from the cavity 84 such that the hole 4 becomes filled and only a small mound remains following completion of the operation.

The present invention provides a method of removing a tree 12, the method comprises the steps of providing a tree removal device 14 comprising a housing 16, shaft 20, bit assembly 26, and stabilizing portion 24; positioning the device 14 over a tree 12 comprising a base 10 and tree trunk 8, such that the trunk 8 is bent from a generally vertical position to a generally horizontal position such that the stabilizing portion 24 substantially surrounds the base 10 of the tree 12; securing the tree trunk 8 with said stabilizing portion 24; causing the shaft 20, together with the bit assembly 26, to rotate and move downward, such that a hole 4 is formed in the area below the base 10 of the tree 12 and the root ball 3 and roots 2 are disrupted by the turning bit assembly 26.

The foregoing disclosure and showings made in the drawing are merely illustrative of the principles of this invention and are not to be interpreted in a limiting sense. While the invention is shown in only a few forms, it is not just limited to the forms shown, but is susceptible to various changes and modifications without departing from the spirit thereof. The foregoing description of a preferred embodiment of the invention has been presented for the purpose of illustration and description. It is not intended to be exhaustive or to limit the invention to the precise form disclosed. Obvious modifications or variations are possible in light of the above teachings. The invention may be adapted for use in a number of environments.

The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention in accordance with the breadth of this disclosure, to which it is fairly, legally, and equitably entitled to be interpreted.

I claim:

1. A tree removal device, the device comprising:
   a housing;
   a shaft;
   a bit assembly comprising a pilot bit and a cutting portion;
   a stabilizing portion;
   the housing comprising one or more vertical walls, one or more horizontal walls, first and second vertical sliding members, a connection plate, and a base plate;
   the baseplate comprising a front portion, a lower portion of the one or more vertical walls being coupled to the front portion;
   wherein one or more of the one or more horizontal walls is coupled to one or more of the one or more vertical walls;
   said connection plate being adapted for coupling to a cooperative coupling plate of a tractor;
   the shaft, bit assembly, and stabilizing portion each sharing a central longitudinal axis;
   said shaft and bit assembly being rotatable around the central longitudinal axis, the stabilizing portion and housing being non-rotatable around the central longitudinal axis;
   the bit assembly being coupled to a lower end of the shaft;
   the stabilizing portion being tubular, such that a hollow space is defined by an inner wall extending between stabilizing portion upper and lower ends;
   said stabilizing portion upper end being coupled to the base plate;

the first vertical sliding member being slidingly coupled to the second vertical sliding member such that the stabilizing portion may be moved from a first position to a second position;

the cutting portion extending radially from a position proximate to the central longitudinal axis such that a central portion of the cutting portion is proximate to the central longitudinal axis and a cutting portion end is positioned distal from the central longitudinal axis;

said bit assembly, when the stabilizing portion is in the first position, being positioned within the hollow space of the stabilizing portion such that the cutting portion end is proximate to the inner wall of the stabilizing portion; and said bit assembly, when the stabilizing portion is in the second position, being positioned outside the hollow space such that the cutting portion end is below the lower end of the stabilizing portion.

2. The tree removal device of claim 1, wherein the stabilizing portion lower end comprises teeth.

3. The tree removal device of claim 1, the stabilizing portion comprising an outside diameter greater than an outside diameter of a trunk of a tree to be removed.

4. The tree removal device of claim 3, the bit assembly further comprising a shearing portion.

5. The tree removal device of claim 4, the shearing portion being structured and arranged to lop off portions of the tree extending between the teeth as the cutting portion end is moved to a position adjacent to the teeth.

6. The tree removal device of claim 5, wherein the cooperative coupling plate of a tractor is a skid steer attachment plate.

* * * * *